United States Patent Office 3,482,195
Patented Dec. 2, 1969

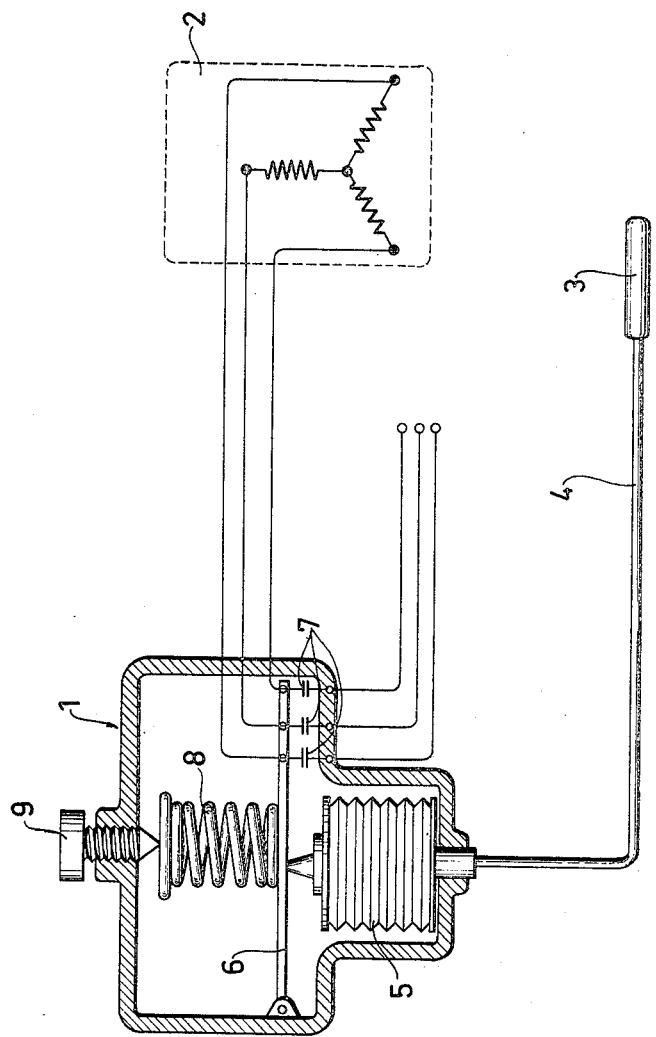

3,482,195
THERMOSTATIC CONTROL DEVICE FOR A THREE-PHASE TYPE ELECTRICAL APPARATUS
Sven-Olof Jansson, Fredagsgrand 13, Halmstad, Sweden
Filed Oct. 30, 1967, Ser. No. 678,779
Claims priority, application Sweden, Nov. 2, 1966, 15,004/66
Int. Cl. H01h 37/38, 37/36
U.S. Cl. 337—321                              1 Claim

ABSTRACT OF THE DISCLOSURE

A thermostat for controlling electric apparatus connected to three-phase mains has contact means connected to each phase. One of the contact means is adjusted to be switched at a temperature differing from the temperature in which the other two contact means are adjusted to be switched. Thus the contact means may be set to disconnect the phase connected thereto at a temperature which for example may be about 5° C. lower than the disconnecting temperature of the other two contact means.

Summary

In the thermostats of the usual kind, e.g. capillary thermostats or bimetal thermostats which are used for controlling the heat generated by sauna (i.e. Finnish steam bath) units, the difference between the connecting and disconnecting temperature of the thermostat is generally relatively great, about 10° C. A sauna unit besides has such a high effect that even such short delays in the disconnection of the thermostat as may arise as a consequence of temporary cooler air currents and other factors of the same kind will entail an increase of the temperature in the sauna by several degrees above the temperature set, which will result in the changes of temperature in many cases becoming directly unpleasant for the people taking a bath in the sauna.

In order to avoid these drawbacks, the thermostat according to the invention is characterized in that one of the contact members is adapted to be switched at a temperature differing from the temperature at which the other two contact members are adapted to be switched.

Preferably, the difference in switching temperature is of such a kind that one phase will become disconnected at a temperature which is about 5° C. less than the disconnecting temperature of the other two phases.

Brief description of drawing

The figure is a diagrammatic view of a thermostat connected to three-phase mains and has a contact member connected to each mains phase.

Description of preferred embodiment

The thermostat shown in the drawing is a capillary thermostat 1 which is connected between the three-phase mains and a Y-connected electric heating apparatus 2, which may for instance consist of a sauna unit. The thermostat 1 has a sensing member 3 which is connected by means of a capillary tube 4 to a bellows 5 or the like disposed in the thermostat. The sensing member 3 is filled with a medium which will adjust the size of the bellows 5 at temperature changes in the space surrounding the sensing member in dependence of said changes. The movements of the bellows 5 are transmitted to an arm 6 on which one contact member out of three contact means 7 is disposed. The second contact member of the contact means 7 is stationarily disposed in the outer casing of the thermostat. When the temperature of the sensing member 3 sinks, the bellows 5 will contract so that the arm 6 is swung downwards and the contact member of the contact means 7 will come into contact with each other, thereby closing the circuit to the unit 2. The arm 6 is loaded by a spring 8 the tension of which can be set by means of a screw 9 for controlling the temperatures at which the thermostat is meant to close and open the circuit.

According to the invention, one of the contact means 7 is set in such a way that it will open and close the circuit at a slightly lower temperature than the other two contact means. This is achieved by making the distance between the contact members of the first-mentioned contact means greater than the distnace between the contact members of the other contact means.

In case the apparatus 2 is a sauna unit, all three contact means 7 have their circuits closed when the unit is not in operation. When the sauna is to be heated and the circuit is closed, all three phases will consequently be connected to the unit. This results in relatively quick heating of the sauna, and the medium located in the sensing member will expand the bellows 5, which will swing the arm upwards. When the temperature in the sauna approaches the temperature set on the thermostat, that contact means 7 in which the distance between the contact members is adjusted to the greatest distance, will of course first disconnect its phase, whereupon the unit will continue heating the sauna on two phases only to that temperature at which the thermostat will disconnect also these phases. When the temperature falls once more, only the two latter phases will become connected, and the unit will operate at reduced power if the temperature originally set is maintained or reduced. This results in a more evenly and more precisely controlled temperature in the sauna.

When the unit is controlled by means of a thermostat according to the invention, the effect developed by the unit will thus be adjusted to the requirements in a very advantageous manner because all three phases are connected when the temperature sensed by the sensing body is considerably lower than the one set on the thermostat, while only two phases are connected when the said temperature difference is small.

The effect of the unit may be adjusted in such a way to the sauna space that the temperature will be kept essentially constant when the unit is connected to two phases. It is also possible to use two thermostats of the indicated kind in one and the same sauna unit, in which case it is possible to obtain a four-stage control of the connected effect.

The thermostat according to the invention may of course be of another type than a capillary thermostat and may be used for other purposes than for heating sauna units.

What I claim is:
1. A thermostatic control device for a three phase type electrical apparatus, comprising a housing, three mutually spaced stationary contact elements within said housing, a lever pivoted at one end within said housing, three mutually spaced movable contact elements mounted on said lever to be movable therewith, said movable contact elements each being disposed opposite one of said stationary contact elements to form a pair of cooperating contact elements therewith, said stationary and said movable contact elements, respectively, spaced from each other a greater distance in one of said pairs of cooperating contact elements than in the other pairs when all pairs of contact elements are opened, a coil spring within said housing bearing centrally against one side of said lever for urging the latter to close said pairs of contact elements, an adjusting screw for said spring carried by said housing and actuatable from the outside thereof, a thermally actuated expansible bellows within said housing engaging the other side of said lever, and a temperature responsive element having a capillary tube connected to said bellows.

References Cited

UNITED STATES PATENTS

| 2,833,894 | 5/1958 | Weber et al. | 337—309 |
| 3,235,692 | 2/1966 | Kucera | 337—310 |

BERNARD A. GILHEANY, Primary Examiner

H. B. GILSON, Assistant Examiner

U.S. Cl. X.R.

337—310